United States Patent Office 3,573,105
Patented Mar. 30, 1971

3,573,105
RECHARGEABLE NON-AQUEOUS ALKALI METAL-HALOGEN ELECTROCHEMICAL CELLS
Joseph L. Weininger and Thomas O. Rouse, Schenectady, N.Y., assignors to General Electric Company
No Drawing. Filed Oct. 27, 1966, Ser. No. 595,293
Int. Cl. H01m 27/00
U.S. Cl. 136—86                                    7 Claims

ABSTRACT OF THE DISCLOSURE

A rechargeable non-aqueous alkali metal-halogen electrochemical cell is described which includes an alkali metal anode, a halogen cathode, and a non-aqueous electrolyte. The cell has an ion permeable barrier between the electrodes separating the electrolyte into anolyte and catholyte reservoirs.

---

Our invention relates to an electrochemical cell system utilizing an alkali metal anode, a halogen cathode, and a non-aqueous electrolyte.

Of the recognized restraints on enlarged applications of electrochemical cell systems the limitations of low cell potential and low energy density have remained paramount, despite long continued efforts at their improvement. To one having only a casual acquaintance with the electrochemical arts, achieving an improvement in cell potential and energy density over the cells presently commercially available might, at first encounter, seem a simple matter. Inasmuch as alkali metals lie near one extreme of the electromotive series of elements and halogens near the opposite extreme, it would appear obvious that an electrochemical cell system capable of utilizing alkali metal as an anode reactant and halogen as a cathode reactant would yield an exceptionally high potential as compared to cells commonly employed commercially. When the high potential characteristics of these materials are further considered in combination with the low equivalent weights of certain of the materials, such as lithium, sodium, and chlorine, alkali metals and halogens also appear desirable for use in constructing cells and batteries capable of yielding a high energy output per unit of weight.

As might be expected both halogens and alkali metals have been thoroughly investigated as electrode reactants for electrochemical cell systems, both separately and in combination. Despite many articles published and patents issued relating to improvements in cells comprised of such reactants, to this date no significant commercial exploitation of these materials either singly or in combination has been undertaken.

A number of previously unsolved difficulties relating to alkali metal and halogen electrodes account for this continued non-use. First, whereas aqueous electrolytes have been used nearly universally in both "wet" and "dry" cells, alkali metals spontaneously react with water to liberate hydrogen gas and form the corresponding alkali hydroxide. The main approach to solving this difficulty has been the identification of various non-aqueous solvents which are inert to alkali metals. While organic solvents have been suggested for use in such cells, no solvent sufficiently stable toward both alkali metal and halogen electrode reactants has been heretofore disclosed. For example, primary amines have been proposed as solvents for lithium bromine cells, but such amines contain relatively active hydrogen that interfere with the proper functioning of the lithium electrode.

Another approach to using alkali metal electrode reactants has been to dissolve the metal in a mercury amalgam. One disadvantage to this approach is that a parasitic loss of alkali metal still takes place at the interface of the aqueous electrolyte and the amalgam. A further disadvantage is that, absent agitation of the amalgam, the current density that can be sustained by any such electrode is limited by the rate at which the alkali metal can diffuse through the amalgam. The disadvantages of constructing a cell requiring continuous pumping or agitation are, of course, obvious. Another consideration is that the alkali metal concentration of the amalgam must be limited to only a few percent in order to maintain a fluid amalgam. This then means that a substantial weight of mercury must be incorporated in any cell in order to attain any substantial capacity. Certainly, the amalgam electrode approach does not appear particularly beneficial to achieving a high energy density cell.

Halogen electrodes, while disclosed in the patent literature prior to the turn of the century, have to this day presented a number of well recognized disadvantages. One of these is low solubility of halogens in aqueous electrolytes. This has markedly limited the attainment of the high energy densities from halogen cells that might be predicated on molecular weight considerations. Another disadvantage of halogen electrodes is that while halogens must be dissolved to be utilized, such dissolved halogens will migrate to the anode and chemically react to spontaneously discharge the cell. Perhaps the most common approach to attempting to control halogen mobility has been to adsorb the halogen on a carbon matrix, such as graphite or charcoal. Another approach has been to interpose an ionically permeable diffusion barrier for unreacted halogen between the halogen cathode and the cell anode. Such approach has, however, heretofore been confined to an aqueous electrolyte system. There has been no previous recognition in the art of an alkali metal-halogen cell having a high halogen concentration, a halogen migration barrier, and a non-aqueous electrolyte which are mutually compatible.

It is an object of our invention to provide a rechargeable electrochemical cell exhibiting a high energy density and capable of developing a relatively large potential between the electrodes.

It is an additional object to provide a novel electrolyte solvent for an electrochemical cell system including intermediate molecular weight halogen as an electrode reactant.

The objects of our invention are accomplished in one aspect by employing in combination with an intermediate molecular weight halogen electrode reactant an electrolyte comprised of an organic solvent chosen from the class consisting of alkylene carbonates and lactones having five and six member rings and having substituents chosen from the class consisting of hydrogen and alkyl groups comprised of, in aggregate, as many as three carbon atoms, in combination with an ionically dissociable solute inert to the intermediate molecular weight halogen as well as polyhalides thereof.

As herein employed, the terms anode, anolyte, cathode, and catholyte refer to the negative electrode, the electrolyte adjacent the negative electrode, the positive electrode, and the electrolyte adjacent the positive electrode, respectively. That is, the terms are for convenience used as they would apply to the cell when used as a primary cell or during discharge when used as a secondary cell, although it is recognized that on charge of the cell when used as a secondary cell the elements would function inversely.

In a preferred embodiment of our invention, we employ alkali metal as a negative electrode reactant, hereafter, in accordance with accepted usage, designated an alkali metal electrode. Of the alkali metal electrodes we prefer to use lithium electrodes, since lithium is the alkali metal with the highest oxidation potential and the lowest molecular weight. The alkali metal may entirely comprise the electrode or it may be supported on a more noble metal, such as nickel, platinoid metals, silver, etc., according to techniques well understood in the art.

As a positive electrode reactant halogen of intermediate molecular weight is preferred. Chlorine, bromine, or iodine may be used alone or in combination. As is well understood, the electrical properties—i.e., electrode potential and energy density characteristics—improve with decreasing atomic weight while the chemical properties become increasingly less suitable. Although fluorine is the halogen most easily reduced and of lowest atomic weight, its use is not preferred because of the off-setting practical disadvantages of extremely high reactivity and corrosiveness. Astatine, because of its rarity, is of no practical interest. Of the intermediate molecular weight halogens, bromine is generally most preferred as an electrode reactant, since it offers the most practically suitable balance of chemical and electrical properties.

Inasmuch as halogen reactants, are fluid under the conditions of use, it is necessary that the halogen electrode include a current collector. As is recognized in the art, the current collector may be formed of any electrically conductive material which is chemically stable toward the halogen and the polyhalides thereof. For example, bromine and its intermediate reduction product, the tribromide anion, are sufficiently stable toward carbon, tantalum, and platinum that these metals may be usefully employed as current collectors. Chlorine is also stable toward these materials while iodine, being less chemically reactive, is chemically stable toward these materials as well as the platinoid metals generally. In order to achieve high current densities it is preferred that the current collectors be fabricated into a form exhibiting a high surface area per unit weight. Because of its low cost and high specific surface area, carbon in the form of charcoal or graphite is generally preferred as a current collector.

The positive and negative electrodes are ionically communicated by an electrolyte. It is our discovery that lactones and alkylene carbonates having five and six member rings are chemically stable toward both intermediate molecular weight halogen and alkali metal electrodes. Such materials accordingly may be used to form the solvent of an electrolyte for such electrodes. Acceptable properties are obtainable with alkyl ring substituents contributing in aggregate up to about three additional carbon atoms. Suitable solvent materials include 1,2-alkylene carbonates, 1,3-alkylene carbonates, gamma lactones, and delta lactones. Specifically contemplated solvents include, ethylene carbonate, 1,2-propylene carbonate, 1,3-propylene carbonate, 1,2-butylene carbonate, 2,3-butylene carbonate, 1,3-butylene carbonate, 1,2-amylene carbonate, 2,3-amylene carbonate, 1,3-amylene carbonate, 2,4-amylene carbonate, 1,3-hexylene carbonate, 2,4-hexylene carbonate, 1,2-hexylene carbonate, 2,3-hexylene carbonate, and gamma butyrolactone as well as the lactones of 4-hydroxypentanoic acid, 5-hydroxypentanoic acid, 4-hydroxyhexanoic acid, 5-hydroxyhexanoic acid, 4-hydroxy-5-methylhexanoic acid, 4-hydroxyheptanoic acid, 5-hydroxyheptanoic acid, 4-hydroxy-5-methylheptanoic acid, 5-hydroxy-6-methylheptanoic acid, and 5-hydroxyoctanoic acid.

Any material that is ionically dissociable in the solvent and chemically inert toward the electrode reactants may be employed as a solute for the electrolyte. Where alkali metal and halogen electrodes are employed in combination, the solute may be an alkali halide. As is well understood in the art the ionized alkali halide provides ionic electrical conductivity between the electrodes. Cells using alkali halide as the sole ionic conductor function satisfactorily, but are subject to the disadvantage that, if overcharged, solute may be substantially depleted from the electrolyte, thereby adversely affecting its conductivity. Accordingly, in certain applications it may be preferred to incorporate as the solute akali perchlorate. This insures a high initial level of electrolyte conductivity, even following over-charge. It is recognized that upon discharge of an alkali metal-halogen cell alkali halide will be formed as a reaction product and will supplement the alkali perchlorate in providing electrical conductivity between the electrodes. It is, of course, preferred that the alkali metal and halides incorporated as the electrolyte solute correspond to the alkali metal and halogen employed as electrode reactants. The concentration of the solute in the solvent is not critical. It is generally preferred to incorporate the minimum amount sufficient to yield the desired level of conductivity when the cell is fully charged.

Whereas conventional halogen electrode cells employing an aqueous electrolyte require storage of the halogen by adsorption in the current collector, this frequently resulting in a bulky halogen electrode structure, in our cell the organic solvent electrolyte exhibits substantial solubility toward intermediate molecular weight halogen, so that the halogen reactant may be stored completely within the electrolyte or may be only partially adsorbed on the current collector and the remainder dissolved in the electrolyte.

Since our novel electrolyte exhibits a high solubility toward dissolved halogen, it is preferred to employ as an element of our cells an ion permeable barrier to inhibit migration of halogen to the negative electrode, which will produce self-discharge of the cells. Any conventional ion permeable barrier may be employed for this purpose which is not chemically attacked by halogen. As a simple illustration, the barrier may consist of a salt bridge of the type frequently used to communicate anolyte and catholyte reservoirs in laboratory cell constructions.

For a variety of reasons ion exchange structures and particularly ion exchange membranes have been found to be highly suitable ion permeable barriers. Although ion exchange membranes have been previously suggested for use in combination with halogen electrodes, so far as we are aware such membranes have been employed only in combination with aqueous electrolytes. Further, it has been generally assumed that both cation and anion exchange membranes may be employed with equal advantage.

It is our observation that cells including dissolved halogen as a positive electrode reactant in combination with an organic solvent may be internally discharged not only by dissolved halogen migration, but also by the migration of incompletely reduced products, such as polyhalides. In this circumstance it is noted that an anion exchange membrane would be ineffective to prevent internal discharge, since while such a membrane might, if properly chosen, prevent or hinder the migration of dissolved halogen, it would not prevent the migration of a polyhalide anion. To illustrate, bromine on reaction in an organic solvent is first reduced to the tribromide and is then reduced to the bromide. An anion exchange membrane while possibly blocking the migration of dissolved bromine therethrough would not block the migration of the tribromide.

We have found to be suitable for use in cells having an intermediate molecular weight halogen electrode and a novel organic electrolyte of the type described, ion permeable barriers formed of cation exchange membranes. In order to achieve the desired level of stability toward the halogen reactants it is necessary to employ either hydrocarbon or halocarbon, preferably fluorocarbon, polymers having ion exchange substituents. We have found cross-linked hydrocarbon ion exchange polymers to be generally preferable to the corresponding linear polymers. Preferred cation exchange materials include sulfonated copolymers of styrene and divinyl benzene employed alone or in combination with fluorocarbon polymers as disclosed, for example, by Hodgdon et al. in commonly assigned applications Ser. Nos. 413,940 and 414,011, filed Nov. 25, 1964. A preferred fluorocarbon ion exchange polymer is the sulfonated polymer of $\alpha,\beta,\beta$-trifluorostyrene, disclosed by Hodgdon et al. in commonly assigned application Ser. No. 444,010, filed Mar.

30, 1965. The ion exchange material may be homogeneously or heterogeneously distributed throughout the membrane, and the membrane may be formed entirely of synthetic resin or the synthetic resin constituent may be formed around or supported on an inert support, such as a cloth backing. A wide variety of cation exchange membranes of the type desired for use in our cells are known to the art and commercially available.

To further illustrate the range of ion permeable barriers which may be used in our cells, reference is made to the novel barrier disclosed and claimed by Joseph L. Weininger in co-pending application Ser. No. 589,823, filed on even date herewith. This barrier is formed by binding into a unitary structure particles having very small through pores. Although not essential to utility, the particles preferably exhibit ion exchange properties and, most preferably, cation exchange properties. Such particles differ from normal ion exchange resin particles in that they exhibit structurally fixed pores. The term "macro-reticular" is frequently used to distinguish from conventional ion exchange resin particles which are termed "micro-porous," although universally recognized to lack pores in the conventional, structural sense of the term. The particles may be formed from hydrocarbon or halocarbon polymers according to known techniques. After formation the particles may be chemically treated to provide ion exchange substituents. Where ion exchange properties are combined it is preferred that only cross-linked polymers be used. Where the particles are to be used as a barrier for the migration of intermediate molecular weight halogen and polyhalides thereof the pores are, of course, chosen of a size that will allow migration hindrance while permitting migration of monohalides. It has been determined that average pore sizes of less than 200 angstroms are effective for this purpose, average pore sizes of less than 100 angstroms being preferred. Larger pore sizes may be used with reduced efficiency. As a specific example of suitable particles having through pores, Rohm and Haas Company commercially markets under the trademark "Amberlite XAD-2" a macro-reticular material formed of the copolymer of styrene and divinyl benzene having average pore diameter of 90 angstroms. Other forms of the material differing by average pore size and by the inclusion of sulfonate groups are available under the trademarks "Amberlyst XN 1005" and "Amberlyst 15." These are merely exemplary of a family of suitable particulate materials available under the trademarks "Amberlite" and "Amberlyst."

To form a unitary barrier we prefer to crush the particles so that they pass through a 50 mesh screen, although this is not essential, and to bond the particles with a hydrocarbon or halocarbon polymer, most preferably a fluorocarbon polymer. Specific preferred binders are polymers of vinylidene fluoride and chlorotrifluoroethylene as well as copolymers thereof. It is, of course, recognized that there are a large number of hydrocarbon and halocarbon polymers that could be used including but not limited to polyethylene, polypropylene, polystyrene, polyvinyl chloride, polyvinylidene chloride, polyhexafluoropropylene, polytetrafluoroethylene, etc. The binder is preferably limited to the minimum amount sufficient to bond the particles at their points of tangency. It is recognized that this quantity will vary somewhat, depending on the particular size of the macro-reticular particles. In using materials passing through a 50 mesh sieve binder proportions of as little as 10 percent and as great as 90 percent by volume have been found satisfactory.

The binder may be applied by any of a variety of conventional molding techniques. According to a preferred technique in which the binder softens at a temperature substantially below that of the material comprising the macro-reticular particles, the composite is placed in a mold and heated to the softening temperature of the binder. This technique works well in the preferred embodiment in which the macro-reticular particles are formed of a thermosetting cross-linked ion exchange material and the binder is a thermoplastic fluorocarbon.

The advantage of using an ion permeable barrier having through pores as described over a conventional cation exchange membrane is that the former exhibits a fraction of the electrical resistance of the latter for comparable ion exchange ratings and thicknesses. In one form of the barrier in which ion exchange properties are absent, the through pores function in a manner analogous to a sieve in permitting the migration of small ions therethrough while proportionately hindering the migration of larger ions. Accordingly, simple mono-atomic halide anions penetrate the barrier pores with ease while dissolved molecular halides and polyhalides thereof are hindered in migration. When the barrier is additionally provided with cation exchange properties, the ionic permeability is enhanced by the ability of cations to be readily exchanged through the pores. At the same time smaller size anions and cations may penetrate the pores by diffusion while larger size anions are not only physically hindered from passage through the pores but are additionally electrically repelled.

In a preferred, comprehensive embodiment of our invention we contemplate the use of our novel organic solvent electrolyte and barrier in combination with alkali metal and intermediate molecular weight halogen electrodes. These elements cooperate to form a chemically compatible, novel electrochemical cell providing a solution to many of the difficulties heretofore encountered in the art. At the same time, however, it is recognized that an alkali metal halogen cell presents the most stringent of chemical requirements and other positive or negative electrodes may be readily substituted without resorting to invention. Further, we consider the sub-combination of the organic solvent electrolyte and the halogen electrode to be in itself a significant advance in the art.

Our invention may be more readily understood by reference to the following working examples.

EXAMPLE 1

Macro-reticular beads of sulfonated styrene-divinyl benzene copolymer were purchased from Rohm and Haas under the trademark "Amberlyst 15." The beads contained pores having an average diameter of 400 angstroms, a porosity of from 30 to 35 percent, and a surface area of from 40 to 50 m.$^2$/g. As purchased, the beads were in the hydrogen ion form. They were exchanged into the lithium form by soaking three times in a 0.2 molar solution of lithium bromide in propylene carbonate. Between each soaking the material was vacuum dried. The beads were then crushed and sifted through a 50 mesh screen. Polychlorotrifluoroethylene purchased under the trademark "Kel-F" was prepared as a powder passing through a 35 mesh screen. The polychlorotrifluoroethylene was charged to a molding surface held at 240° C. in an amount of 0.3 gram. When the material showed signs of melting, 0.9 gram of "Amberlyst 15" previously prepared and crushed as described above was added. Molding was accomplished at a gauge pressure of 15,000 p.s.i. A membrane was obtained having a thickness of 17 mils and a diameter of 2 inches.

EXAMPLE 2

The procedure of Example 1 was repeated, except that "Amberlyst XN 1005" was substituted for "Amberlyst 15." The former material differs from the latter in that it has average pore diameter of 80 angstroms, a porosity of 42 percent, and an average surface area of 125 m.$^2$/g. "Amberlyst XN 1005" was used in the amount of 0.75 gram and polyvinylide fluoride purchased under the trademark "Kynar" was used in like amount. A molding temperature of 165° C. and a pressure of 22,500 p.s.i. were used. The resultant membrane was 10 mils thick and 2 inches in diameter.

EXAMPLE 3

The procedure of Example 1 was repeated, except that "Amberlite XAD-2" was substituted for "Amberlyst 15." The former material differs from the latter in that it is not sulfonated, therefore devoid of ion exchange properties, and has average pore diameters of 90 angstroms, a porosity of from 40 to 45 percent, and a surface area of 290 to 330 m.$^2$/g. "Amberlyst XAD-2" and "Kynar" were each used in the amount of 0.75 gram. Molding was accomplished at 165° C. and a pressure of 22,500 p.s.i. The resultant membrane was 22 mils thick and 2 inches in diameter.

In each of the following examples a test cell construction was used having a lithium electrode immersed in an anolyte and uniformly spaced 1/16 in. from one surface of a barrier and a carbon electrode immersed in a catholyte and uniformly spaced 1/16 in. from the opposite surface of the barrier. The lithium electrode was in each instance formed of a 1/16 in. deposit of lithium supported on a 50 mesh screen of either platinum or silver plated nickel. The carbon electrode, except as otherwise noted below, was formed of a 1/8 in. thickness of spectrographic grade carbon of high purity and having 25 percent porosity.

EXAMPLE 4

A cation exchange membrane of a type commercially available from American Machine and Foundry was employed having a thickness of 7.5 mils, comprised of 12 percent by weight of the sulfonated copolymer of styrene and divinyl benzene and the remaining solids being "Aclar 22A," a trademark for copolymer formed of 96.5 percent by weight chlorotrifluoroethylene and 3.5 percent by weight vinylidene fluoride. The water content of the membrane was initially 20 percent by weight and the ion exchange capacity 0.60. Prior to use the water in the membrane was displaced with 1,2-propylene carbonate.

A cell was constructed as described above using the cation exchange membrane as a barrier, 0.2 molar lithium bromide in 1,2-propylene carbonate as the anolyte, a lithium anode, 0.2 molar lithium bromide together with 1 molar dissolved bromine in 1,2-propylene carbonate as the catholyte, and carbon as the cathode current collector.

An open circuit voltage of 4.28 volts was obtained (3.20 volts on the lithium side with reference to a standard hydrogen electrode and $-1.08$ volt on the bromine side against the same reference). At the potential of 3.15 volt a current of 0.7 ma. was obtained. Cell resistance was determined to be 1200 ohms, i.e., 3300 ohm-cm.$^2$. This high cell resistance was noted to be primarily attributable to the membrane and reducible by lowering the thickness of the membrane.

EXAMPLE 5

The cell used in Example 4 was modified by substituting an ion exchange membrane prepared as described by Example 1, increasing the bromine concentration to 1.50 molar, and increasing the lithium bromide concentration to 1.60. The cell exhibited an open circuit voltage of 3.77 volts. The cell was placed through 7 charge-discharge cycles with charge and discharge each being performed in one our at the current of approximately 5 ma. During discharge the cell exhibited a potential of approximately 2.5 volts. The cell showed no signs of deterioration in use.

EXAMPLE 6

A cell was constructed using a membrane as prepared in Example 3, which lacked ion exchange properties. A lithium anode was used and a carbon cathode current collector as described above. The anolyte consisted of 1.37 molar lithium perchlorate and 1.0 molar lithium bromide in gamma-butyrolactone. The catholyte was identical to the anolyte except for additional inclusion of 0.14 mole of concentration of dissolved iodine.

The cell had an open cell voltage of 3.98 to 3.39 volts, depending on its state of charge. The internal resistance was 164 ohms, equivalent to 462 ohm-cm.$^2$. The cell was placed through 10 charge-discharge cycles with charge intervals of 30 minutes at 10 ma. and discharge intervals of 60 minutes at 5 ma. The voltage varied from 2.2 volts to 1.5 volts on discharge.

EXAMPLE 7

A cell was constructed using a membrane as described by Example 2. A lithium anode was used and a carbon cathode current collector was employed. The anolyte was 2.6 molar lithium perchlorate in 1,2-propylene carbonate, and the catholyte was 0.2 molar lithium bromide and 0.12 molar iodine in 1,2-propylene carbonate. An open circuit voltage of 3.92 volts was obtained. The cell was placed through 4 charge-discharge cycles with charge and discharge each being performed in one hour at the current density of approximately 2 ma./cm.$^2$. No deterioration in cell performance was noted.

EXAMPLE 8

A cell was constructed using a membrane as prepared by Example 2. A lithium anode was employed, and the cathode was formed of battery grade carbon. The carbon exhibited a porosity of 80 percent and a purity of 99.9 percent. The anolyte consisted of 0.4 molar lithium iodide and 1.0 molar lithium perchlorate in 1,2-propylene carbonate. The catholyte consisted of 0.74 molar lithium iodide, 0.33 molar dissolved iodine, and 1.0 molar lithium perchlorate in 1,2-propylene carbonate.

The cell exhibited a maximum open circuit voltage of 3.87 volts. The cell was placed through 18 cycles. Test results are reported in Table I.

TABLE I.—CHARGE-DISCHARGE CHARACTERISTICS OF CELL

| | Charge | | | | OCV | Discharge | | | | OCV |
|---|---|---|---|---|---|---|---|---|---|---|
| | | | Potential | | Open circuit | | | Potential | | At end of |
| Cycle No. | Current, ma. | Time, min. | Start volts | End volts | at end of charge | Current, ma. | Time, min. | Start volts | End volts | discharge, volts |
| 1 | 10 | 30 | 5.00 | 5.00 | 3.20 | 5 | 60 | 2.17 | 2.14 | 2.88 |
| 2 | 10 | 30 | 4.80 | | 3.20 | 5 | 60 | 2.20 | 1.11 | |
| 3 | 10 | 30 | 4.84 | 4.84 | 3.17 | Varied | 60 | Varied | | 2.93 |
| 4 | 5 | 30 | 4.78 | 4.82 | 3.08 | 5 | 60 | 3.08 | 2.22 | 2.90 |
| 5 | (¹) | (¹) | (¹) | (¹) | 2.96 | 5 | 60 | 2.65 | 2.20 | 2.93 |
| 6 | 10 | 30 | 4.23 | 4.24 | 3.40 | 5 | 60 | 2.72 | 2.12 | 2.94 |
| 7 | 10 | 30 | 4.33 | 4.26 | 3.32 | 5 | 60 | 2.67 | 1.25 | 2.96 |
| 8 | 10 | 30 | 4.53 | 4.78 | 3.18 | 5 | 60 | 2.40 | 1.25 | 2.93 |
| 9 | 10 | 30 | 4.50 | 4.81 | 3.20 | 5 | 60 | 2.46 | 2.02 | 2.93 |
| 10 | 10 | 30 | 4.50 | 4.72 | 3.25 | Varied | 60 | Varied | | 3.11 |
| 11 | (²) | (²) | (²) | (²) | 3.18 | Varied | 80 | Varied | | 2.93 |
| 12 | 10 | 30 | 4.38 | 4.28 | 3.28 | 5 | 60 | 2.67 | 2.18 | 2.93 |
| 13 | 10 | 30 | 4.39 | 4.39 | 3.32 | 5 | 60 | 2.65 | 1.80 | 2.93 |
| 14 | 10 | 30 | 4.41 | | 3.32 | 10 | 30 | 1.78 | 0.08 | 2.85 |
| 15 | 10 | 30 | 4.50 | 4.62 | 3.27 | 10 | 30 | 1.86 | −0.29 | 2.43 |
| 16 | 10 | 30 | 4.40 | 4.78 | 3.38 | 5 | 60 | 2.48 | 2.10 | 2.95 |
| 17 | (²) | (²) | (²) | (²) | 3.20 | 5 | 60 | 2.78 | −0.70 | 2.97 |
| 18 | 10 | 80 | 4.65 | 4.42 | 3.87 | 10 | 70 | 3.00 | −0.26 | 2.97 |

¹ Trickle-charged at 2 ma. for 63 hours (weekend).
² Trickle-charged at 2 ma. for 15 hours (overnight).

EXAMPLE 9

Macro-reticular beads of styrene-divinyl benzene copolymer were purchased from Rohm and Haas under the designation "CYM-361." The beads contained pores having an average diameter of 27 angstroms, a porosity of 33.8 percent, and a surface area of 690 m.$^2$/g. The beads did not exhibit ion exchange properties. The beads were crushed and passed through a 50 mesh screen. A similar procedure was used to prepare "Kynar" in particulate form. The crushed beads and "Kynar" were then blended in equal parts by weight. The composition so formed was then charged to a molding surface heated to 165° C. and molded at a pressure in the range of from 22,500 to 30,000 p.s.i.

The barrier so formed was mounted in a cell using as the anolyte, 0.2 M LiBr+0.8 M LiCl/O$_4$ in 1,2-propylene carbonate. The catholyte consisted of 1.6 M LiBr and 1.5 M Br$_2$ in 1,2-propylene carbonate. The maximum open circuit voltage observed was 3.62 volts. The cell was put through two cycles in each of which it was charged for 1 hour at 2 ma./cm.$^2$ and discharged for 1 hour at 1 ma./cm.$^2$. No evidence of deterioration in use was observed. The cell was left standing for five days during which it was carefully observed for discoloration of the anolyte, thereby indicating bromine penetration of the barrier. No bromine diffusion was visually observed. This was corroborated using an ultraviolet spectrophotometer.

While our invention is disclosed and described with reference to certain preferred embodiments, it is appreciated that numerous modifications will readily occur to those skilled in the art. Accordingly, it is intended that the scope of our invention be determined with reference to the following claims.

What we claim as new and desire to secure by Letters Patent of the United States is:

1. An electrochemical cell comprised of
   spaced positive and negative electrodes,
   an electrolyte providing an ionically conductive path between said electrodes comprised of
   an organic solvent chosen from the class consisting of alkylene carbonates and lactones said carbonates and lactones having five and six member rings and having substituents chosen from the class consisting of hydrogen and alkyl groups comprised of, in aggregate, as many as as three carbon atoms, and
   an ionically dissociable solute inert to the intermediate molecular weight halogen as well as polyhalides thereof,
   ion permeable barrier means interposed between said electrodes separating said electrolyte into anolyte and catholyte reservoirs,
   said catholyte reservoir including dissolved halogen of intermediate molecular weight when said cell is fully charged, and
   said positive electrode and said solute both being substantially inert toward said dissolved halogen and polyhalides thereof.

2. An electrochemical cell according to claim 1 in which the negative electrode is comprised of an alkali metal.

3. An electrochemical cell according to claim 1 in which the negative electrode is comprised of lithium.

4. An electrochemical cell according to claim 1 in which said dissolved halogen is bromine.

5. An electrochemical cell according to claim 1 in which said dissolved halogen is iodine.

6. An electrochemical cell according to claim 1 in which said positive electrode utilizes carbon as a current collector.

7. An electrochemical cell according to claim 1 in which said interposed means is a cation exchange membrane.

References Cited

UNITED STATES PATENTS

| | | | |
|---|---|---|---|
| 2,921,110 | 1/1960 | Crowley et al. | 136—86 |
| 3,279,952 | 10/1966 | Minnick | 136—100 |
| 3,380,855 | 4/1968 | Mahy et al. | 136—100 |
| 3,393,092 | 7/1968 | Shaw et al. | 136—6 |
| 3,393,093 | 7/1968 | Shaw et al. | 136—6 |
| 2,901,522 | 8/1959 | Bopp | 136—84 |
| 3,360,401 | 12/1967 | Grasselli et al. | 136—86 |

WINSTON A. DOUGLAS, Primary Examiner

H. A. FEELEY, Assistant Examiner

U.S. Cl. X.R.

136—153